| (12) | United States Patent<br>Degani et al. | (10) Patent No.: US 8,195,460 B2<br>(45) Date of Patent: Jun. 5, 2012 |
|---|---|---|

(54) SPEAKER CHARACTERIZATION THROUGH SPEECH ANALYSIS

(75) Inventors: Yoav Degani, Moshav Beit-Halevi (IL); Yishai Zamir, Givataim (IL)

(73) Assignee: Voicesense Ltd., Netanya (IL)

( * ) Notice: Subject to any disclaimer, the term of this patent is extended or adjusted under 35 U.S.C. 154(b) by 973 days.

(21) Appl. No.: 12/140,413

(22) Filed: Jun. 17, 2008

(65) Prior Publication Data

US 2009/0313018 A1    Dec. 17, 2009

(51) Int. Cl.
*G10L 15/06* (2006.01)
*G10L 11/04* (2006.01)
*G10L 11/06* (2006.01)
*G10L 21/00* (2006.01)

(52) U.S. Cl. ......... 704/243; 704/207; 704/210; 704/270

(58) Field of Classification Search .................. None
See application file for complete search history.

(56) References Cited

U.S. PATENT DOCUMENTS

| 6,006,188 | A | 12/1999 | Bogdashevsky et al. | |
|---|---|---|---|---|
| 6,151,571 | A * | 11/2000 | Pertrushin | 704/209 |
| 6,173,260 | B1 * | 1/2001 | Slaney | 704/250 |
| 7,451,079 | B2 * | 11/2008 | Oudeyer | 704/205 |
| 7,606,701 | B2 * | 10/2009 | Degani et al. | 704/207 |
| 7,995,717 | B2 * | 8/2011 | Conway et al. | 379/88.16 |
| 2006/0122834 | A1 * | 6/2006 | Bennett | 704/256 |
| 2008/0103761 | A1 * | 5/2008 | Printz et al. | 704/9 |
| 2010/0088088 | A1 * | 4/2010 | Bollano et al. | 704/201 |

FOREIGN PATENT DOCUMENTS

| EP | 1256937 | 11/2002 |
|---|---|---|
| EP | 1423846 | 6/2004 |

OTHER PUBLICATIONS

J. Liscombe, G. Riccardi, and D. Hakkani-Tur, "Using context to improve emotion detection in spoken dialog systems," in Proc. Interspeech, 2005.*
Sinad McGilloway, Roddy Cowie, Ellen Douglas-Cowie, Stan Gielen, Machiel Westerdijk, and Sybert Stroeve, "Approaching Automatic Recognition of Emotion from Voice: A Rough Benchmark," ITRW on Speech and Emotion, Sep. 5-7, 2000.*
Graciarena Martin et al. "Combining Prosodic Lexical and Cepstral Systems for Deceptive Speech Detection", Acoustics, Speech and Signal Processing, May 14-19, 2006 XP032000988, Toulouse, France.
International Search Report of the International Search Authority—PCT/IL2009/000604—dated on Dec. 23, 2009.
Written Opinion of the International Search Authority—PCT/IL2009/000604—dated on Dec. 23, 2009.

* cited by examiner

*Primary Examiner* — Matthew Sked
(74) *Attorney, Agent, or Firm* — The Law Office of Michael E. Kondoudis

(57) ABSTRACT

A computer implemented method, data processing system, apparatus and computer program product for determining current behavioral, psychological and speech styles characteristics of a speaker in a given situation and context, through analysis of current speech utterances of the speaker. The analysis calculates different prosodic parameters of the speech utterances, consisting of unique secondary derivatives of the primary pitch and amplitude speech parameters, and compares these parameters with pre-obtained reference speech data, indicative of various behavioral, psychological and speech styles characteristics. The method includes the formation of the classification speech parameters reference database, as well as the analysis of the speaker's speech utterances in order to determine the current behavioral, psychological and speech styles characteristics of the speaker in the given situation.

2 Claims, 5 Drawing Sheets

SPEAKER CHARACTERIZATION THROUGH SPEECH ANALYSIS

TECHNICAL FIELD

The present invention relates to the field of speech analysis, and more particularly, to the use of prosodic features of the speech for determining current behavioral, psychological and speech style characteristics of a person in a specific situation.

BACKGROUND OF THE INVENTION

Speech analysis is a general term given to computerized methods that process human speech utterances in order to uncover the information they carry. Speech analysis is classified as part of the phonetics discipline within the linguistic sciences.

Speech analysis may be divided into two main approaches: The first approach is focused on revealing the content of the speech by learning how words, syllables and phonemes are pronounced and how sentences are arranged. Many of the speech recognition applications, such as 'speech to text' or 'word spotting' use this approach in order to extract the content of the speech.

The second approach, analysis of speech prosody, focuses on the manner in which the speech is spoken, by analyzing the non-segmental (non-words, non-content) features of the speech such as intonation, tempo, intensity, stressing and rhythm.

The manner in which the speech is spoken provides the speech "melody", which adds significant insight to the overall meaning and context of the speech. For example, people perceive a sentence as a question sentence by the rising intonation at the end of the sentence. Accents are a classic example of how prosodic speech parameters alter the pronunciation of words. Actors modify the prosody of their speech to sound like a certain character. There are also gender differences in prosody, for example, females typically having higher frequencies than males. Many times, prosodic features change the meaning of the speech: We interpret the same sentence as having a cynical, sarcastic or simple meaning by changes in the manner (prosody) in which it is pronounced.

Prosodic characteristics of the speech utterances carry information also about the emotional state of the speaker. This has been shown over the years by many works in the literature. It is also intuitively grasped—an excited person calling an emergency service would typically have a fast speech pace, his voice would be intense, breathy, fluctuated etc. On the other hand, a person in a sad, gloomy state would tend to speak slowly, with low energy, long pauses and the like. These characteristics are reflected in the prosodic speech features.

Several patents have been issued in respect to using prosodic speech features in order to automatically analyze the emotional state of speakers. Among them, U.S. Pat. No. 6,151,571 to Pertrushin, U.S. Pat. No. 6,173,260 to Slaney, for classifying different emotional states, and European Patent No. EP 1423846 to Degani and Zamir, for determining emotional arousal in general. All patents are incorporated by reference herein it their entirety.

Few attempts were made to correlate between the speaker's personality and the prosodic characteristics of speech. U.S. Pat. No. 6,006,188 to Bogdashevsky describes a method of determining the speech features of people with similar personality types (according to known psychological inventories), and then using the detected features for automatic classification of personality types. The idea that personality is reflected in the speech makes sense and can also be grasped intuitively: one can imagine, for example, the soft and hesitated speech patterns of an introverted person as opposed to the loud and impulsive speech patterns of an extroverted person.

Linking personality and speech patterns reflects well the understanding that speech expresses wide aspects of personal characteristics. However, the weakness of this concept lies in its practical implementation. Personality represents steady characteristics of a person; therefore it should also be measured rather consistently. This means that the speaker's speech patterns, reflecting his personality, should remain fairly consistent over changing situations, varying inner states and different contexts. This is not the case in reality: speech patterns tend to be strongly affected by situational factors, as evident, for example, from the proved, firm relation between emotional states and speech prosody. Even the introverted person from the abovementioned example gets angry from time to time, and when he does his speech patterns (and his prosodic speech parameters) change significantly and resemble much more to the speech patterns of an outgoing, extroverted person. Perhaps statistically, if we would measure the introverted person's speech patterns in many different occasions, there would be a significant correlation between his personality and his speech patterns. It may also be reliable if we sample a person's speech under very similar conditions to the conditions in which the reference data, representing the speech patterns of a certain personality, was taken. But this wouldn't be the case when an intervening situational factor will be dominant. In real-life, situational factors are frequently affecting the speech. Therefore, personality measurement through speech prosody can not be perceived as a situation-independent method.

BRIEF SUMMARY

The present invention suggests a computer implemented method, data processing system, a computer program product and an apparatus, which analyze speech utterances of a speaker, for determining current behavioral and psychological characteristics of the speaker as well as current speech style of the speaker in a given situation and context.

The analysis is based on calculating unique secondary derivatives of the primary pitch and amplitude parameters of the speech utterances, which when used together are indicative of the speaker's current behavioral, psychological and speech style characteristics in a specific situation and context.

Classification of the current behavioral, psychological and speech style characteristics is performed by comparison of the speaker's calculated speech secondary parameters, to pre-obtained data, representative of the values and the value-combinations of these speech secondary parameters for various behavioral and psychological characteristics and for different speech styles in a range of situations and contexts.

An aspect of the present invention provides a general, speaker-independent method, for determining current behavioral, psychological and speech styles characteristics of a person by analyzing the prosodic features of the person's speech in a specific situation. Personal characteristics of the speaker's may be related either to transient, situation dependent parameters or to steady, situation independent parameters, such as personality. Embodiments of the present invention enable to determine, for example, whether a person currently sounds direct, open, detached, expressive or reserved, without determining whether these qualities reflect his inherent nature or the specific situation and context. This type of information can be extremely valuable to the analyzed person himself for various feedback and training purposes, as well as to people communicating with the analyzed person for better understanding and communication with him.

In various embodiments, the present invention is realized as a computer implemented method, data processing system, a computer program product and an apparatus for characterizing situational behavioral, psychological and speech styles characteristics of a speaker, from unique, secondary indicators of the speech that are disclosed.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 1:
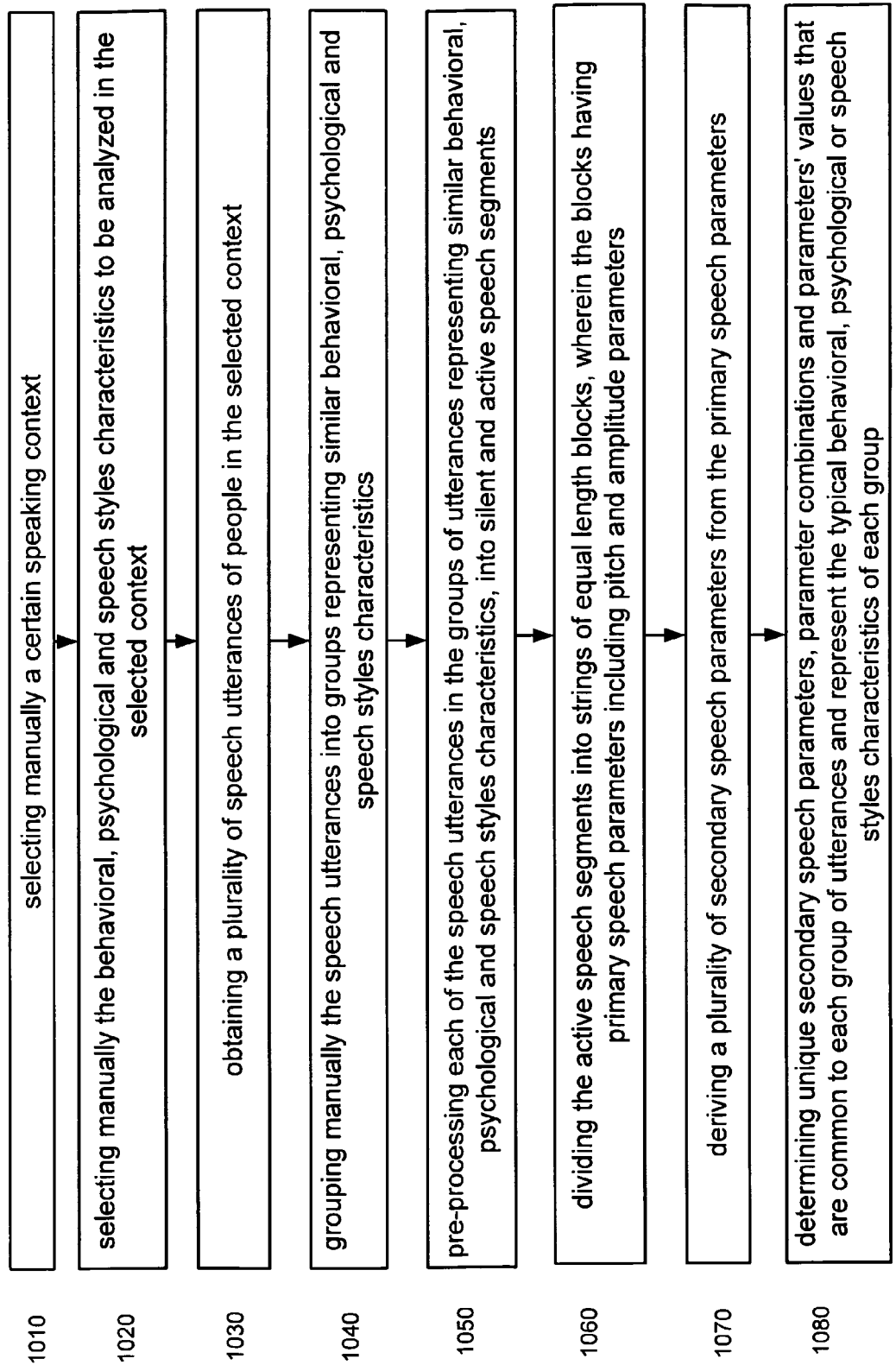
FIG. 1 is a high level flowchart showing the stages of obtaining and forming the speech parameters reference data for classifying different behavioral, psychological and speech styles characteristics, in accordance with the method of the present invention.

The drawings together with the description make apparent to those skilled in the art how the invention may be embodied in practice.

DETAILED DESCRIPTION OF THE INVENTION

Prior to setting forth the invention in detail, it may be helpful to set forth definitions of certain terms that will be used hereinafter.

The term "situational" as used herein means characteristics pertaining or relevant to the current state of the speaker. Conversely, situational characterization may not prove valid to the speaker in general. For example, a situational characterization of a speaker may be: "The speaker sounds assertive" (now), or "The speaker sounds reserved" or "The speaker sounds calculated" and the like. This doesn't mean to say that the speaker is, by nature, assertive, reserved or calculated in general, but rather that the speaker sounds that way in the current analyzed utterance of speech. Clearly, the same speaker may sound differently in different situations.

The term "contextual" as used herein in this application is defined as representing general characteristics of the situation (that may affect the speech) that are derived, attributed or influenced either by the biographical background of the speaker, comprising factors such as culture, language, accent, age, and the like, or by special attributes of the situation's setting, such as conversation or monologue, reading-loud written text or free speech, regular speech conditions or speech during physical activity, during acting in a play, while lecturing, while giving a speech, under stressful situation—combat, emergency, ball game and the like.

The term "speech styles" as used herein means typical speech patterns, representing clusters of behavioral and psychological characteristics, which tend to be used in certain situations. For example, expressive speech style, calculated speech style, direct speech style and the like. People tend to change their speech styles in accordance with the specific situation and context.

The term "communication system" as used herein pertains to any voice communication system that enables the transference of voice utterances. These systems may be, for example, wired or wireless telephony systems, cellular communication network, web-based communication systems, other voice over IP based communication systems, call center systems and the like.

In the following detailed description, many specific details are set forth in order to provide a thorough understanding of the invention. However, it is understood that the teachings of the present invention may be practiced without these specific details. In other instances, well-known methods, procedures, components and circuits have not been described in detail so as not to obscure the teachings of the present invention.

The present invention, in some embodiments thereof, discloses a computer implemented method, data processing system, an apparatus and a computer program product for determining situational behavioral, psychological and speech style characteristics of a speaker utilizing speech analysis techniques.

The present invention is based on the fact that speech patterns reflect a wide scope of behavioral and psychological characteristics of the speaker beyond just emotional states. One can think of many such behavioral or psychological characteristics that are not emotions but are expressed through speech patterns: For example, directness, assertiveness, responsiveness, openness, expressiveness, being hesitated, reserved, commanding, controlled, calculated, patient, impatient, and empathetic and so on and so forth. The present invention is directed at the ability to analyze these behavioral and psychological characteristics and the like from speech utterances.

According to embodiments of the invention, the implementation of the present invention takes into account that the reflections of these characteristics in the speech patterns are mainly of a situational nature rather than a steady, constant nature. Sometimes such a behavioral characteristic would be related to the context of the situation, sometimes to the emotional state of the speaker, sometimes to the personality of the speaker and many times it would be a combination of all factors. For example, a direct, assertive speech pattern can characterize a standard coach-player conversation in middle of a game (context) or it can be related to the anger of a dissatisfied customer in a customer service conversation (emotion). Yet in other cases it may reflect a general assertive personality of the speaker. The speech prosody parameters (reflecting pace, intonation, intensity and the like.) can indicate that currently the speech sounds assertive, but they can't point out its specific context or differentiate whether it is related to the situation or to the personality.

Hence, these are the two main bases of the current invention: Prosodic features of the speech reflect a wide range of behavioral and psychological characteristics of the speaker; and Manifestation of these characteristics in the speech patterns has a strong situational nature, i.e. it is indicative mainly of the current state of the speaker.

Therefore, it is the object of the present invention to provide a general, speaker-independent method, for determining current behavioral and psychological characteristics of a person by analyzing the prosodic features of the person's speech in a specific situation.

Advantageously, the present invention may be used to provide feedback to people of their behavioral and psychological characteristics in different situations, as part of various training applications for vocational, educational, therapeutic and recreational purposes. It can also be used to provide insight to other people of how to best communicate with the analyzed person, based on the understanding of current behavioral and psychological characteristics of the analyzed person for various business applications as well as vocational, educational, therapeutic and recreational purposes.

One of the challenges addressed by the present invention is to extract and detect parameters indicative of the behavioral and psychological characteristics, which are speaker independent. People differ significantly in their individual prosodic speech characteristics—typical pitch, pace, intonation etc. They may also differ in the individual way they express certain behavioral and psychological characteristics. For example, one may express assertiveness mainly by changing speech intensity and another by altering speech pace etc. Reaching a speaker-independent processing requires overcoming these individual differences in the prosodic expression of the behavioral and psychological characteristics.

The present invention achieves speaker independent processing by using unique secondary speech extractions of the primary pitch and amplitude speech parameters, for analysis of the prosodic features. These secondary parameters are a variety of statistical indicators characteristics of rising-pitch, falling-pitch and equal-pitch segments within the speech utterance. Being less affected by individual speech differences, these unique secondary parameters are therefore more indicative of the behavioral and psychological characteristics per se.

One additional aspect of the present invention is speech styles. When examining empirically the speech patterns of many behavioral and psychological characteristics, it seems apparent that several clusters of such characteristics can be grouped together to form differentiated speech styles. This becomes apparent already when listening to the speech utterances and classifying them: certain behavioral and psychological characteristics tend to frequently appear together within the same utterances (same situation), implying that they may be related. Moreover, when analyzing their prosodic features, certain behavioral and psychological characteristics are more similar to each other in comparison to others, implying again of their relatedness.

Following are a few examples of such potential speech styles. One style may be termed a 'passive' or a 'steady' speech style, comprising behavioral and psychological characteristics such as slowness, quietness, steadiness, calmness, indecisiveness etc. Another style may be termed 'communicative' comprising characteristics such as responsiveness, openness, talkativeness, expressiveness, etc. Another style may be termed 'assertive' comprising directness, commanding, fast-paced, loudness, activeness etc. Yet another style may be termed 'calculated' comprising characteristics such as being analytical, non-emotional, controlled, reserved, systematical etc. These speech styles are brought here only in a way of example. Naturally, several other speech styles can be portrayed by use of the prosodic features.

It is important to stress that these speech styles have a strong situational nature as well. Although from time to time they may represent a steadier characteristic of the speaker, many times they would represent a current interaction pattern, or a current inner state of the speaker relevant to the specific situation or context. Often the same person would switch between such speech styles in different contexts.

Determining such speech styles through speech analysis can be very advantageous for the abovementioned potential applications of the present invention, as it can provide a more comprehensive insight of the analyzed situation.

Therefore, it is also the object of the present invention to provide a general, speaker-independent method for determining current speech styles of a person by analyzing the prosodic features of the person's speech in a specific situation.

Embodiments of the present invention take advantage of three main aspects that differentiate them from traditional prosodic speech analysis methods. The first aspect is significantly broadening the scope of personal characteristics of a speaker that are determined through prosodic speech analysis. A wide variety of behavioral, psychological and speech styles characteristics are claimed to be determined by the analysis, beyond the emotional state of the speaker, which was the main application demonstrated in the past. The second differentiating aspect is the linkage between the current, situational, behavioral attributes of a speaker and his or her corresponding speech characteristics. The third differentiating aspect is the use of unique secondary extractions of the fundamental frequency and amplitude parameters of the speech, to achieve speaker-independent processing. The use of these unique secondary parameters and their combinations enables to overcome individual differences in speech expression, such that similar behavioral and psychological aspects are represented similarly in the speech characteristics of different people.

FIG. 1 illustrates a high level flowchart showing the steps of the method of creating a speech parameters reference database for classifying various behavioral, psychological and speech styles characteristics, according to some embodiments of the invention. The method comprises: selecting manually a certain speaking context, e.g. a certain language, culture or unique situation setting 1010; selecting manually the behavioral, psychological and speech styles characteristics to be analyzed in the selected context 1020; obtaining a plurality of speech utterances of people in the selected context 1030; and grouping manually the speech utterances into groups representing similar behavioral, psychological and speech styles characteristics 1040. This is performed using valid and known evaluation methods such as expert ratings, peer-rating, self-ratings, objective tests and the like, or any other evaluation method used and known in the social and behavioral sciences. Such situational characteristics may be, by way of example only, directness, assertiveness, responsiveness, openness, expressiveness, being hesitated, reserved, commanding, controlled, calculated, patient, impatient, empathetic or any other situational behavioral and psychological characteristic that may be expressed or reflected in the speech patterns. Such a speech style may be, by way of example only, a 'passive' or 'steady' speech style, comprising several behavioral and psychological characteristics such as slowness, quietness, steadiness, calmness, indecisiveness etc, or a 'communicative' speech style comprising characteristics such as responsiveness, openness, talkativeness, expressiveness, etc., or an 'assertive' speech style comprising directness, commanding, fast-paced, loudness, activeness etc., or a 'calculated' speech style comprising characteristics such as being analytical, non-emotional, controlled, reserved, systematical etc. According to some embodiments of the invention, the database may contain speech parameters representative of any number (one or more) of behavioral, psychological and speech styles characteristics. The method also includes: pre-processing each of the speech utterances in said groups of utterances representing similar behavioral, psychological and speech styles characteristics, into silent and active speech segments 1050; dividing the active speech segments into strings of equal length blocks, said blocks having primary speech parameters including pitch and amplitude parameters 1060; deriving a plurality of secondary speech parameters from the primary speech parameters, said secondary parameters comprising the sum of segments per time unit of equal-pitch, rising-pitch and falling-pitch trends in said strings of blocks and the average lengths of segments of equal-pitch, rising-pitch and falling-pitch trends in said strings of blocks 1070; and determining unique secondary speech parameters, parameter combinations and parameters' values that are common to each group of utterances and represent the typical behavioral, psychological or speech styles characteristics of each group, from said derived secondary parameters 1080. It is to be understood that the use of a database is merely an embodiment of the present invention and that the set, or dictionary of speech parameters and their corresponding behavioral features in a specific context may be stored together in any manner that represent the speech parameters for reference. The database or set of parameters can be stored by different means, or be used for reference by a computer program without the use of an actual software database.

Figure 2:
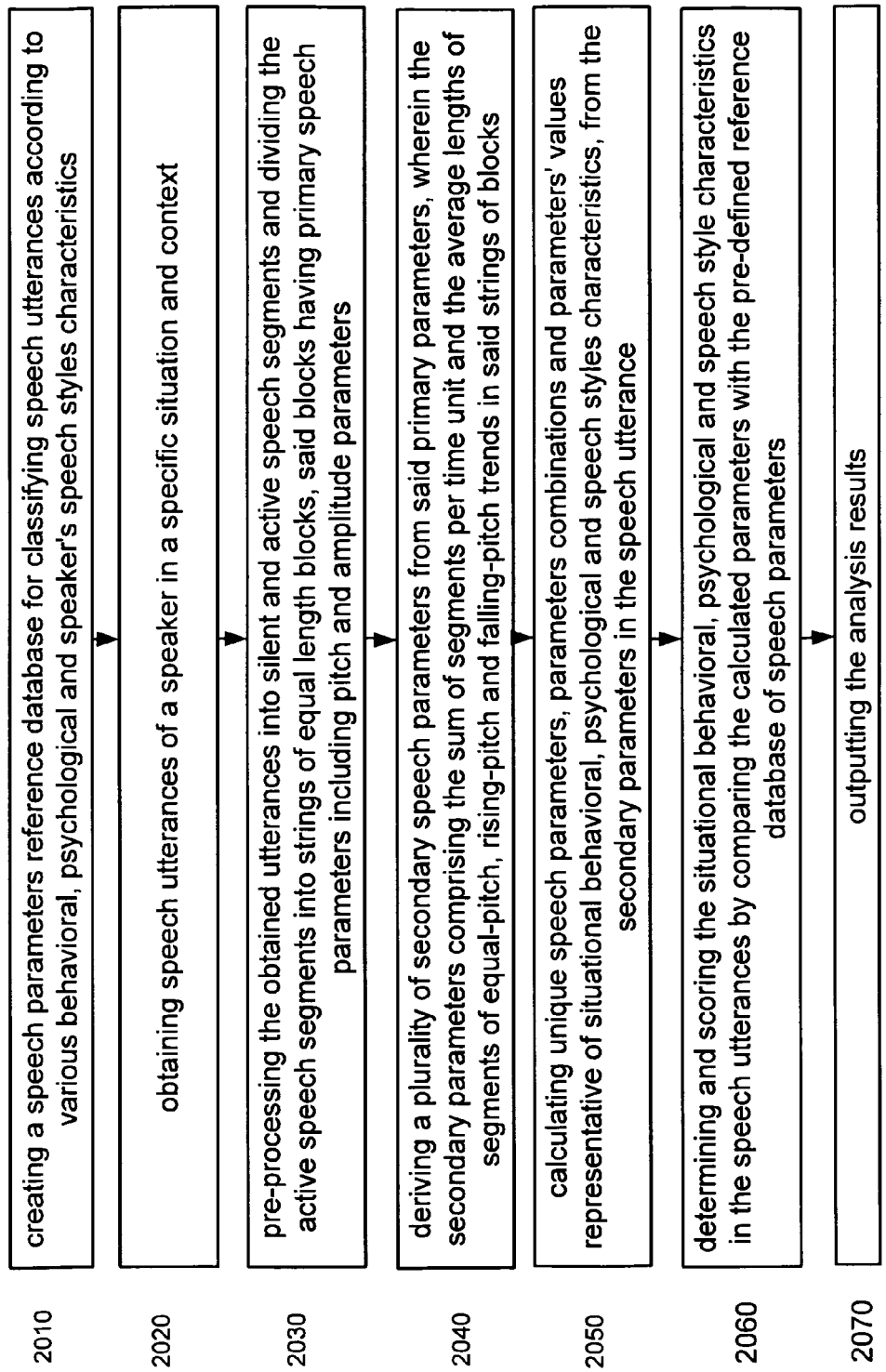
FIG. 2 is a high level flowchart showing the stages of analyzing current speech utterances of a speaker and determining the behavioral, psychological and speech style characteristics of the speaker in the given situation while using the reference database in accordance with embodiments of the present invention.

According to some embodiments of the invention, the stage of deriving a plurality of secondary speech parameters is further directed at parameters selected from a list comprising: average pause length, sum of pauses per time unit, average length of short silences, sum of short silences per time unit, average length of equal pitch segments, sum of equal pitch segments per time unit, average length of rising pitch segments, sum of rising pitch segments per time unit, average length of falling pitch segments, sum of falling pitch segments per time unit, average amplitude dispersion within equal pitch segments, average amplitude dispersion within rising pitch segments, average amplitude dispersion within falling pitch segments, pitch variance and range per time unit, average pitch slope per time unit, patterns of spectral shape and spectral envelope of the speech signal over time, patterns of sequential order of rising, falling and equal pitch trends over time;

FIG. 2 illustrates a high level flowchart showing the steps of the computer implemented method of analyzing speech utterances of a speaker in a given situation and context and determining behavioral, psychological and speech style characteristics of the speaker in the given situation according to some embodiments of the invention. The method comprises: creating a speech parameters reference database for classifying speech utterances according to various behavioral, psychological and speaker's speech styles characteristics 2010; obtaining speech utterances of a speaker in a specific situation and context 2020; pre-processing the obtained utterances into silent and active speech segments and dividing the active speech segments into strings of equal length blocks, said blocks having primary speech parameters including pitch and amplitude parameters 2030; deriving a plurality of secondary speech parameters from the primary parameters, said secondary parameters comprising the sum of segments per time unit of equal-pitch, rising-pitch and falling-pitch trends in the strings of blocks and the average lengths of segments of equal-pitch, rising-pitch and falling-pitch trends in said strings of blocks 2040; calculating unique speech parameters, parameters combinations and parameters' values representative of situational behavioral, psychological and speech styles characteristics, from said secondary parameters in the speech utterance 2050; determining and scoring the situational behavioral, psychological and speech style characteristics in the speech utterance by comparing the calculated parameters with the pre-defined reference database of speech parameters 2060; and outputting the analysis results 2070.

Similarly to the database creation, according to some embodiments, the stage of deriving a plurality of secondary speech parameters is further directed at parameters selected from a list comprising: average pause length, sum of pauses per time unit, average length of short silences, sum of short silences per time unit, average length of equal pitch segments, sum of equal pitch segments per time unit, average length of rising pitch segments, sum of rising pitch segments per time unit, average length of falling pitch segments, sum of falling pitch segments per time unit, average amplitude dispersion within equal pitch segments, average amplitude dispersion within rising pitch segments, average amplitude dispersion within falling pitch segments, pitch variance and range per time unit, average pitch slope per time unit, patterns of spectral shape and spectral envelope of the speech signal over time, patterns of sequential order of rising, falling and equal pitch trends over time.

Figure 3:
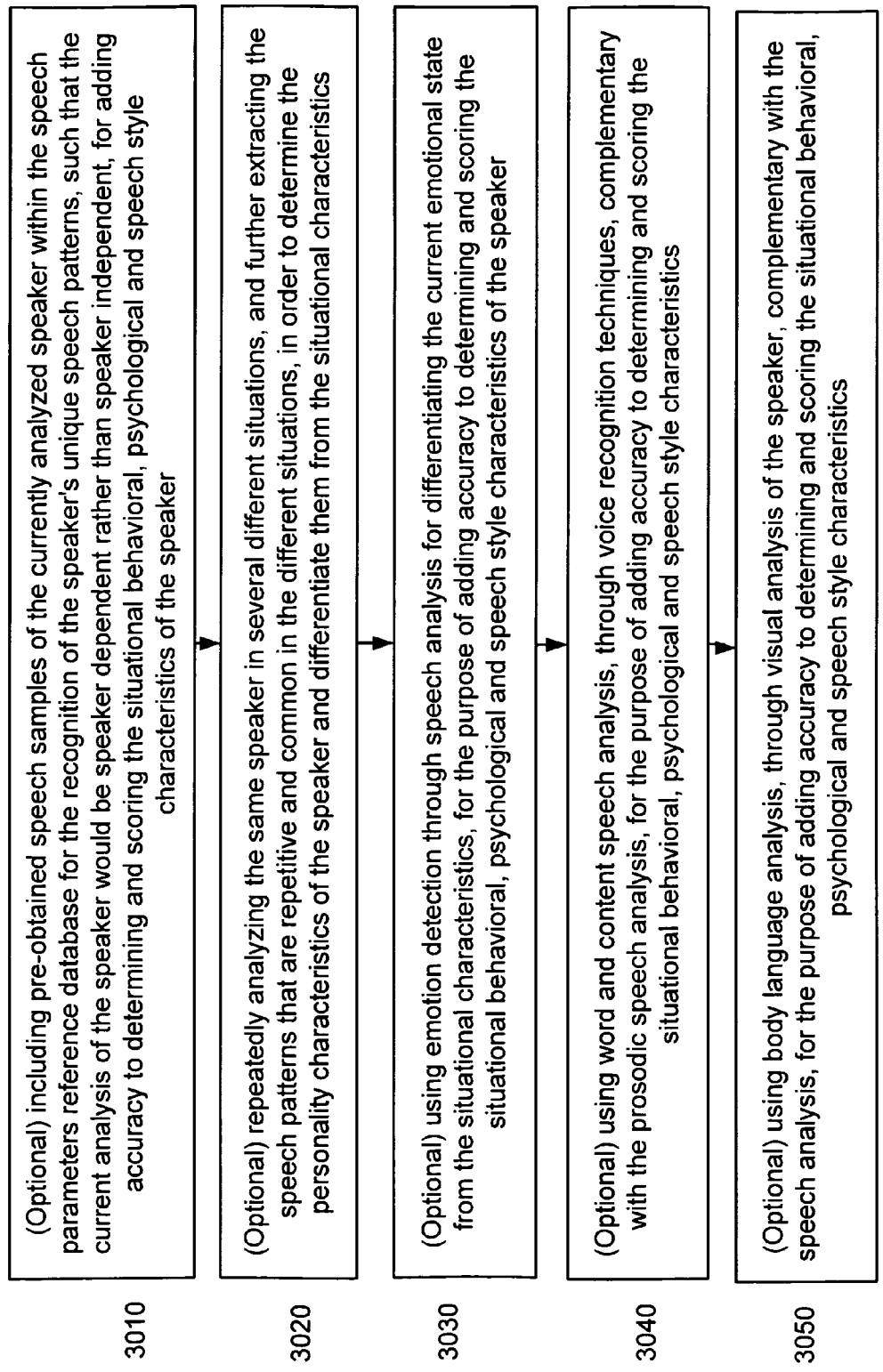
FIG. 3 is a high level flowchart showing some of the optional stages that may be carried out in some embodiments of the invention, in addition and in accordance with the method of the present invention.

FIG. 3 illustrates a high level flowchart showing optional steps of the computer implemented method of analyzing speech utterances of a speaker in a given situation and context and determining behavioral, psychological and speech style characteristics of the speaker in the given situation according to some embodiments of the invention.

According to some embodiments of the invention, the method of analyzing further comprises the stage of including pre-obtained speech samples of the currently analyzed speaker within the speech parameters reference database for the recognition of the speaker's unique speech patterns, such that the current analysis of the speaker would be speaker dependent rather than speaker independent, for adding accuracy to determining and scoring the situational behavioral, psychological and speech style characteristics of the speaker 3010.

According to some embodiments of the invention, the method of analyzing further comprises the stage of repeatedly analyzing the same speaker in several different situations, and further extracting the speech patterns that are repetitive and common in the different situations, in order to determine the personality characteristics of the speaker and differentiate them from the situational characteristics 3020.

According to some embodiments of the invention, the method of analyzing further comprises using emotion detection through speech analysis for differentiating the current emotional state from the situational characteristics, for the purpose of adding accuracy to determining and scoring the situational behavioral, psychological and speech style characteristics of the speaker 3030.

According to some embodiments of the invention, the method of analyzing further comprises the stage of using word and content speech analysis, through voice recognition techniques, complementary with the prosodic speech analysis, for the purpose of adding accuracy to determining and scoring the situational behavioral, psychological and speech style characteristics 3040.

According to some embodiments of the invention, the method of analyzing further comprises using body language analysis, through visual analysis of the speaker, complementary with the speech analysis, for the purpose of adding accuracy to determining and scoring the situational behavioral, psychological and speech style characteristics 3050.

According to some embodiments of the invention, the method of analyzing further comprises providing learning-system features by using ongoing analysis of speakers' behavioral, psychological and speech style characteristics for the purpose of improving the speech parameters reference database and the classifying process.

According to some embodiments of the invention, the method of analyzing is further directed at speech utterances comprising a plurality of speakers wherein the method further comprises separating the plurality of speaker voices and wherein each stage of said method is performed separately for each speaker.

Figure 4:
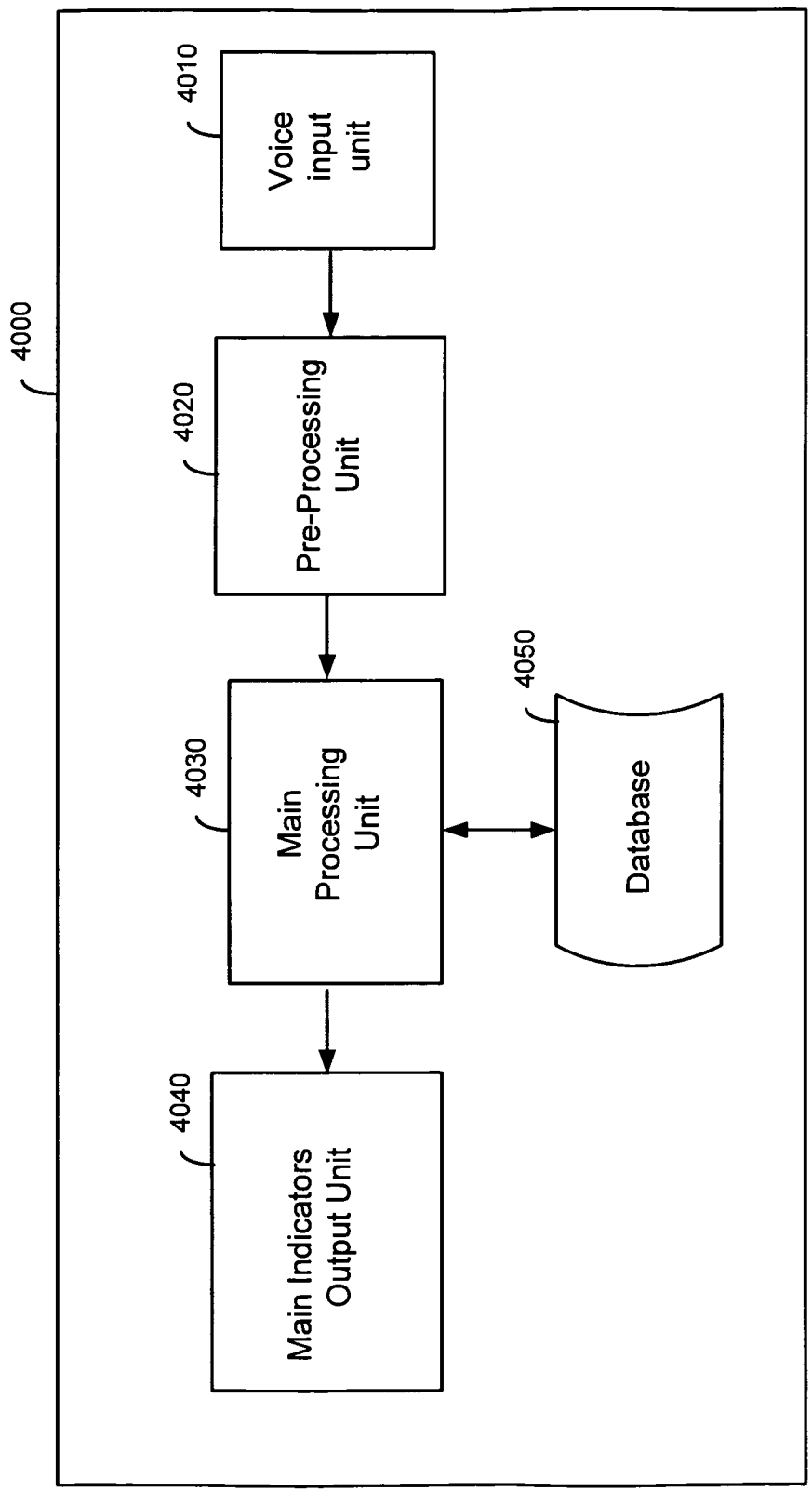
FIG. 4 is a schematic block diagram of a data processing system according to some embodiments of the invention.

FIG. 4 illustrates a high level schematic block diagram showing a data processing system for analyzing a speech utterance of a speaker and determining behavioral, psychological and speech style characteristics of the speaker in a given situation and context according to some embodiments of the invention. System 4000 comprises: a voice input unit 4010 arranged to sample the voice utterances of the speaker or to obtain sampled voice utterances; a pre-processing unit 4020 coupled to voice input unit 4010 and arranged to pre-process voice samples from voice input unit; a main processing unit 4030 coupled to pre-processing unit 4020; a main indicators output unit 4040; and a speakers reference database 4050 coupled to main processing unit 4030.

In operation, voice input unit 4010 is arranged to sample or obtain sampled speech utterances of a speaker in a specific situation and context; pre-processing unit 4020 is arranged to pre-process the sampled utterance into silent and active speech segments and divide the active speech segments into strings of equal length blocks. The blocks having primary speech parameters including pitch and amplitude parameters. Further, database 4050 is arranged to store behavioral, psychological and speech styles classifications and their representative secondary speech parameters and parameters' combinations, wherein such parameters are selected from a list comprising: average pause length, sum of pauses per time unit, average length of short silences, sum of short silences per time unit, average length of equal pitch segments, sum of equal pitch segments per time unit, average length of rising pitch segments, sum of rising pitch segments per time unit, average length of falling pitch segments, sum of falling pitch segments per time unit, average amplitude dispersion within equal pitch segments, average amplitude dispersion within rising pitch segments, average amplitude dispersion within falling pitch segments, pitch variance and range per time unit, average pitch slope per time unit, patterns of spectral shape and spectral envelope of the speech signal over time, patterns of sequential order of rising, falling and equal pitch trends over time; Further, main processing unit 4030 is arranged to derive a plurality of secondary speech parameters from the currently analyzed speech utterance, selected from a list comprising said secondary speech parameters; Main processing unit 4030 is further arranged to calculate the unique speech parameters, parameter combinations and parameters' values representative of situational behavioral, psychological and speech styles characteristics, from said secondary parameters in the speech utterance; It is further arranged to determine and score the situational behavioral, psychological and speech style characteristics in the speech utterance by comparing the said calculated parameters with the pre-defined reference database of speech parameters. Finally, main indicators unit 4040 is arranged to output the analysis results.

According to some embodiments of the invention, output unit 4040 comprises at least one of the following: visual, audio, storage, text, interface to a monitoring device, interface to the internet, interface to a local and a remote device or computer, interface to another network, interface to a wired, wireless or cellular telephone, interface to a computer game, interface to a toy, interface to an electronic personal organizer, and interface to an electronic output equipment.

According to some embodiments of the invention, system 4000 is implemented within a communication system selected from a group comprising: voice communication system, wired or wireless communication system, cellular communication network, web-based communication system, other voice over IP based communication system, and call centers communication system.

According to some embodiments of the invention system 4000 is configured for use in at least one of the following uses: self-feedback, self-awareness, entertainment, behavioral training, sales enhancement, customer service enhancement, customer and business intelligence, defense and security applications, business negotiation, advertising, match-making, dating, recreation, gaming, toys, counseling, human-resources applications, executive training, employee and vocational training, psychological and educational applications, and medical applications.

According to some embodiments of the invention database 4050 further comprises pre-obtained speech samples of a currently analyzed speaker for the recognition of the speaker's unique speech patterns, such that the current analysis of the speaker would be speaker dependent rather than speaker independent, for adding accuracy to determining and scoring the situational behavioral, and psychological and speech style characteristics of the speaker.

According to some embodiments of the invention, the system 4000 is further arranged to repeatedly analyze the same speaker in several different situations, and extract the speech patterns that are repetitive and common in the different situations, in order to determine the personality characteristics of the speaker and differentiate them from the situational characteristics.

According to some embodiments of the invention, the system 4000 is further arranged to use emotion detection through speech analysis, for differentiating the current emotional state from the situational characteristics, for the purpose of adding accuracy to determining and scoring the situational behavioral, psychological and speech style characteristics of the speaker.

According to some embodiments of the invention, the system 4000 is arranged to use word and content speech analysis, through voice recognition techniques, complementary with prosodic speech analysis, for the purpose of adding accuracy to determining and scoring the situational behavioral, psychological and speech style characteristics.

According to some embodiments of the invention, the system 4000 is arranged to use body language analysis, through visual analysis of the speaker, complementary with the speech analysis, for the purpose of adding accuracy to determining and scoring the situational behavioral, psychological and speech style characteristics.

According to some embodiments of the invention, the system 4000 is arranged to provide learning-system features by using ongoing analysis of speakers' behavioral, psychological and speech style characteristics for the purpose of improving the speech parameters reference database and the classifying process.

According to some embodiments of the invention, system 4000 is directed at speech utterances comprising a plurality of speakers and wherein the system is arranged to separate the plurality of speaker voices and wherein the system is further arranged to analyze each speaker separately.

Figure 5:
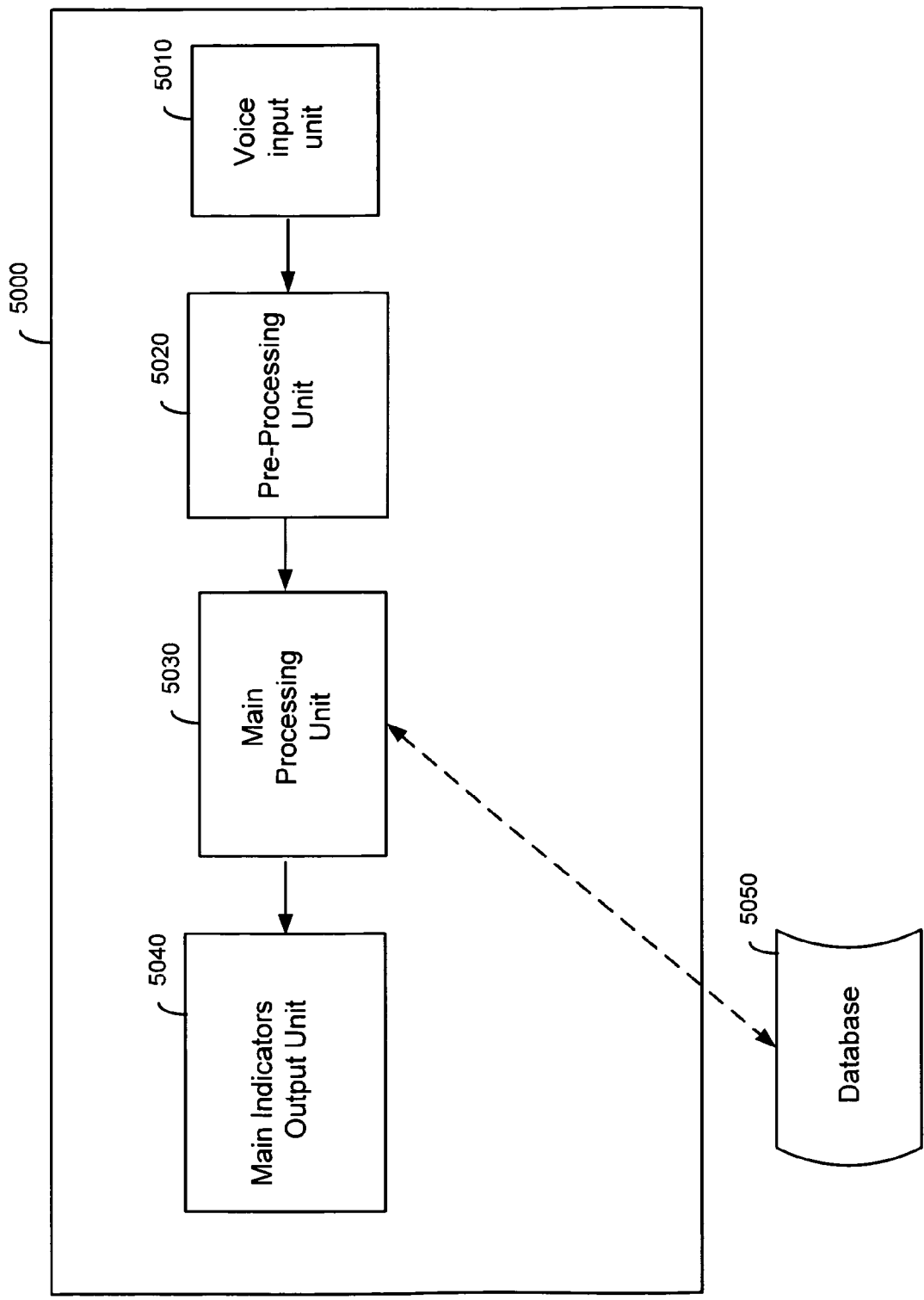
FIG. 5 is a schematic block diagram of an apparatus according to some embodiments of the invention.

FIG. 5 illustrates a high level schematic block diagram showing an apparatus for analyzing a speech utterance of a speaker and determining behavioral, psychological and speech style characteristics of the speaker in a given situation and context according to some embodiments of the invention. Apparatus 5000 comprises: a voice input unit 5010 arranged to sample the voice utterances of the speaker or to obtain sampled voice utterances; a pre-processing unit 5020 coupled to voice input unit 5010 and arranged to pre-process voice samples from voice input unit 5010; a main processing unit 5030 coupled to pre-processing unit 5020; and a main indicators output unit 5040 coupled to main processing unit 5030.

In operation, voice input unit 5010 is arranged to sample or obtain sampled speech utterances of a speaker in a specific situation and context; pre-processing unit 5020 is arranged to pre-process the sampled utterance into silent and active speech segments and divide the active speech segments into strings of equal length blocks. The blocks have primary speech parameters including pitch and amplitude parameters. Further, apparatus 5000 is operatively associated with a reference database 5050 being arranged to store behavioral, psychological and speech styles classifications and their representative secondary speech parameters and parameters' combinations, wherein such parameters are selected from a list comprising: average pause length, sum of pauses per time unit, average length of short silences, sum of short silences per time unit, average length of equal pitch segments, sum of equal pitch segments per time unit, average length of rising pitch segments, sum of rising pitch segments per time unit, average length of falling pitch segments, sum of falling pitch segments per time unit, average amplitude dispersion within equal pitch segments, average amplitude dispersion within rising pitch segments, average amplitude dispersion within falling pitch segments, pitch variance and range per time unit, average pitch slope per time unit, patterns of spectral shape and spectral envelope of the speech signal over time, patterns of sequential order of rising, and falling and equal pitch trends over time.

Further, main processing unit 5030 is arranged to derive a plurality of secondary speech parameters from the currently analyzed speech utterance, selected from a list comprising said secondary speech parameters. Main processing unit 5030 is further arranged to calculate unique speech parameters, parameters' combinations and parameters' values representative of situational behavioral, psychological and speech styles characteristics, from said secondary parameters in the speech utterance; It is further arranged to determine and score the situational behavioral, psychological and speech style characteristics in the speech utterance by comparing the calculated parameters with the pre-defined reference database of speech parameters. Finally, main indicators unit 5040 is arranged to output the analysis results.

According to some embodiments of the invention, apparatus 5000 is configured for at least one of the following uses: self-feedback, self-awareness, entertainment, behavioral training, sales enhancement, customer service enhancement, customer and business intelligence, defense and security applications, business negotiation, advertising, match-making, dating, recreation, gaming, toys, counseling, human-resources applications, executive training, employee and vocational training, psychological and educational applications, and medical applications.

According to some embodiments of the invention, apparatus 5000 is selected from a list comprising a voice communication device, a wired or wireless voice device, a cellular communication device, a networked (or non-networked) personal device accessory (PDA), a voice recording device, a personal computer, and a server.

According to some embodiments of the invention, output unit 5040 comprises at least one of the following: visual, audio, storage, text, interface to a monitoring device, interface to the internet, interface to a local or remote device or computer, interface to another network, interface to a wired, wireless or cellular telephone, interface to a computer game, interface to a toy, and interface to an electronic personal organizer or interface to any other electronic output equipment.

According to some embodiments, the computer implemented method, data processing system, and computer program product of the present invention may be implemented within a wireless or wired line communication system. Specifically, the invention may be implemented in a cellular communication system. The invention may be configured in some embodiments to operate in a real-time environment or alternatively as an offline speech analysis system.

According to some embodiments, the invention may be implemented in a plurality of architectures. For example, there may be provided a central analysis module performing the abovementioned stages on the voice data of phone calls passing through central servers of a cellular operator in any central physical location.

According to other embodiments, the present invention may be implemented as a standalone module embedded as software or hardware in a communication apparatus such as a speech telecommunication device. For example, there may be provided an analysis module performing the abovementioned stages on the voice data of phone calls passing through a specific end-user cellular phone device.

Optionally, embodiments may be utilized for, but not limited to analyzing one of the speakers in a conversation, or both, for the purposes of self-feedback, self-awareness, entertainment, behavioral training, sales enhancement, customer service enhancement, customer and business intelligence, defense and security applications, business negotiation, advertising, match-making, dating, recreation, gaming, toys, counseling, human-resources applications, executive training, employee and vocational training, psychological and educational applications, medical applications, and the like.

According to some embodiments, the computer implemented method, data processing system, apparatus and computer program product of the present invention may be implemented within real-time or offline speech analysis of conversations in call centers and contact centers for improvement of service, sales, customer care, training and other organizational purposes.

According to some embodiments, the present invention provides real-time and offline speech analysis of wired phone conversations, analyzing one of the speakers in a conversation, or both, for the same purposes as described above.

According to some embodiments, the present invention provides real-time and offline speech analysis of web-based conversations, analyzing one of the parties or both parties, for the same purposes as described above.

According to some embodiments, the present invention provides real-time and offline speech analysis of face-to-face conversations analyzing one of the parties or both parties, for the same purposes as described above.

According to some embodiments, the present invention provides real-time and offline speech analysis of any recorded speech, either conversation, self-speech or speech in front of an audience, analyzing one of the parties or both parties, for the same purposes as described above.

Advantageously, the evaluation of communicational, psychological, personal and behavioral characteristics of people provides tremendous importance for various reasons. First, it provides evaluation data for the speaker himself, thus encouraging awareness, development and different learning purposes. In addition, it has significant importance to other people that may want to learn about the speaker, to assist him, to better interact with him, for various purposes—personal, commercial, educational, vocational, medical, and psychological and the like.

According to some embodiments of the invention, the system can be implemented in digital electronic circuitry, or in computer hardware, firmware, software, or in combinations thereof.

The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, digital signal processors (DSPs) but also general purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method of creating a speech parameters reference database for classifying speech utterances according to various behavioral, psychological and speech styles characteristics, said computer implemented method comprising:

selecting manually a certain speaking context;

selecting manually the behavioral, psychological and speech styles characteristics to be analyzed in the selected context;

obtaining a plurality of speech utterances of people in the selected context;

grouping manually the speech utterances into groups representing similar behavioral, psychological and speech styles characteristics;

pre-processing each of the speech utterances in said groups of utterances representing similar behavioral, psychological and speech styles characteristics, into silent and active speech segments;

dividing the active speech segments into strings of equal length blocks, said blocks having primary speech parameters including pitch and amplitude parameters;

deriving a plurality of secondary speech parameters from the primary speech parameters, wherein said plurality of secondary speech parameters includes at least one of: (i) the sum of segments per time unit of: equal-pitch, rising-pitch or falling-pitch trends in said strings of blocks, and (ii) the average lengths of segments of: equal-pitch, rising-pitch or falling-pitch trends in said strings of blocks; and determining unique secondary speech parameters, parameter combinations and parameters' values that are common to each group of utterances from said secondary parameters, wherein said unique secondary speech parameters represent the typical behavioral, psychological or speech styles characteristics of each group.

2. The method of claim 1, wherein the derived plurality of secondary speech parameters includes at least one of: average pause length, sum of pauses per time unit, average length of short silences, sum of short silences per time unit, average length of equal pitch segments, sum of equal pitch segments per time unit, average length of rising pitch segments, sum of rising pitch segments per time unit, average length of falling pitch segments, sum of falling pitch segments per time unit, average amplitude dispersion within equal pitch segments, average amplitude dispersion within rising pitch segments, average amplitude dispersion within falling pitch segments, pitch variance and range per time unit, average pitch slope per time unit, patterns of spectral shape and spectral envelope of the speech signal overtime, patterns of sequential order of rising, falling and equal pitch trends over time.

* * * * *